United States Patent [19]

Tomell

[11] Patent Number: 4,964,609
[45] Date of Patent: Oct. 23, 1990

[54] COMPRESSOR MOUNTING APPARATUS

[75] Inventor: Phillip A. Tomell, Adrian, Mich.

[73] Assignee: Tecumseh Products Company, Tecumseh, Mich.

[21] Appl. No.: 365,697

[22] Filed: Jun. 14, 1989

[51] Int. Cl.$^5$ .......................................... F16M 13/00
[52] U.S. Cl. .................................... 248/638; 417/363
[58] Field of Search ............... 248/673, 680, 681, 154, 248/638, 632, 633, 634, 220.2, 221.3, 222.2, 222.3, 310, 346, 500; 267/153, 292, 141; 417/363

[56] References Cited

U.S. PATENT DOCUMENTS

| | | |
|---|---|---|
| 1,574,985 | 3/1926 | McWain . |
| 1,737,209 | 11/1929 | Valentine .............................. 248/310 |
| 1,864,150 | 6/1932 | Shields . |
| 1,911,804 | 5/1933 | Carpenter . |
| 1,947,501 | 2/1934 | Sharp . |
| 2,151,842 | 3/1939 | Faber ................................... 417/363 |
| 2,384,410 | 9/1945 | Yates . |
| 2,935,279 | 5/1960 | LaPorte et al. . |
| 2,964,236 | 12/1960 | Kasper .................................. 417/363 |
| 3,286,960 | 11/1966 | Douglas et al. . |
| 3,493,201 | 2/1970 | Marran . |
| 3,510,137 | 5/1970 | Freier . |
| 3,790,115 | 2/1974 | Fox et al. . |
| 3,830,595 | 8/1974 | Carpenter ........................... 417/363 |
| 4,180,231 | 12/1979 | Burnham . |
| 4,264,282 | 4/1981 | Crago . |
| 4,399,975 | 8/1983 | Trimarco et al. . |
| 4,461,446 | 7/1984 | Hannibal et al. . |
| 4,549,727 | 10/1985 | Kozar .................................. 248/310 |
| 4,643,386 | 2/1987 | Chastine . |
| 4,730,994 | 3/1988 | Maertens ............................. 417/902 |
| 4,848,711 | 7/1989 | Mandel ................................ 248/154 |

FOREIGN PATENT DOCUMENTS 398083  9/1933  United Kingdom ................. 248/154

Primary Examiner—Ramon O. Ramirez
Assistant Examiner—Robert A. Olson
Attorney, Agent, or Firm—Jeffers, Hoffman & Niewyk

[57] ABSTRACT

The present invention is a vertically upright hermetic compressor for mounting to a horizontal support surface, having a housing, a motor compressor unit within the housing, and a mounting piece. The mounting piece is removably attached to the housing's bottom end for mounting the compressor to the horizontal support surface. It has a resilient body engaged about the housing to cover the housing bottom.

20 Claims, 1 Drawing Sheet

COMPRESSOR MOUNTING APPARATUS

BACKGROUND OF THE INVENTION

The field of the invention is that of hermetic compressors installed in appliances such as refrigerators, freezers, air conditioners, dehumidifiers and the like. More particularly, the field is that of apparatus for mounting a compressor to an appliance frame, enclosure, or cabinet.

Hermetic compressors comprise a motor-compressor unit disposed within a hermetically sealed outer housing. An electrical connection is made via a terminal which extends through a sidewall of the housing, while fluid conduits extend through the sidewall to provide an external connection for the refrigerant fluids. The hermetic compressor is easily incorporated into an appliance by mounting the compressor to the appliance cabinet and making the appropriate electrical and fluid connections. However, compressors generate undesired noise and vibration which can be reduced by mounting the compressor in a manner which suppresses the undesired noise and vibration.

Various structures are used to mount a hermetic rotary compressor in an appliance cabinet, typically upon a horizontal surface in an upright position. One structure has a base plate welded to the bottom of the compressor housing, with the base plate having a plurality of holes that have grommets forcibly fit into them. The grommets have apertures with sleeves through which a nut and bolt assembly is received to secure the compressor and plate to the appliance. Another structure involves welding, to the bottom of the compressor housing, a plurality of support legs which are shaped and positioned to be placed upon posts and interposed between the legs and the horizontal support surface, the posts having a pad or other resilient material to isolate noise and vibration.

The previously mentioned structures require the mounting apparatus to be welded onto the compressor housing. Welding increases the manufacturing cost and subjects the housing to heat which may result in undesired deformation of the housing. Additionally, the extra components (the plate and legs) increase the complexity, hence the chance of error, of assembly.

Another type of structure involves supporting the compressor on a resilient material which separates the compressor from the horizontal support surface. One such structure comprises a plurality of hollow spring cylinders which engage locations on the bottom of the compressor housing, with the compressor resting on the springs. However, this structure requires that the compressor be supported at its top end to insure vertical stability, typically by welding a mounting stud to the compressor housing and providing an additional support structure on the appliance cabinet.

Another prior art mounting structure is disclosed in U.S. Pat. No. 4,461,446 (Hannibal). A plurality of indentations are located on the underside of the compressor housing for receiving grommets. The grommets may be of resilient material so that barbs or other projections on the base surface become embedded in the grommets when the compressor is lowered onto the surface. Although an improvement over previous devices, the Hannibal mounting device still requires additional manufacturing steps to make the projections, to place the grommets on the projections, and to position the compressor so the grommets are within the indentations. Also, this device requires a modification of the compressor housing design to accommodate the indentations.

While these prior art structures serve to attach a compressor to an appliance cabinet, problems exist. The compressor imparts undersired vibration to the supporting base as well as causing noise to radiate from the compressor housing. The noise and vibration are readily transmitted from the compressor mechanism by an end plate which typically forms one end of the compressor housing. These problems are particularly pronounced with compressors having an end plate adjacent to the cylinder block of a rotary vane compressor mechanism, because noise tends to radiate from the end plate.

Thus, what is lacking in the prior art is a mounting structure for attaching a compressor to a horizontal support surface in a vertical position with minimal additional structure on the compressor housing and appliance cabinet, so that vibration and noise radiating from the compressor housing are suppressed.

SUMMARY OF THE INVENTION

The present invention provides a mounting apparatus for mounting a hermetic compressor to a horizontal support surface in an upright position. A resilient boot engages the bottom end of the compressor to substantially cover its bottom end, thus isolating the compressor's vibration and suppressing noise radiating from the bottom end of the housing.

The bottom end of the compressor housing has a circumferential outwardly extending flange and an annular groove on its underside. The mounting boot has a plurality of retainers which fit around the flange, with an upper portion of the retainers extending over the flange.

The retainers define a circumference less than the flange's circumference to frictionally engage the housing bottom end. Additionally, the boot has an upwardly extending annular protrusion located inside the boundary of the sidewall and shaped to fit the groove on the housing bottom end. The retainers fitting around and over the housing flange keep the compressor disposed on the boot, and the boot protrusion serves to support, radially locate, and vertically orient the compressor.

The boot also has a plurality of mounting extensions which are circumferentially disposed around the boot's body. Each extension has a mounting hole which can receive a bolt, screw, or other mounting element to attach the boot to the horizontal support surface. While the boot's body is comprised of thermoplastic rubber and may be of dual hardness, so its extensions preferably include rubber of a harder composition to secure attachment.

The present invention is, in one aspect, a vertically upright hermetic compressor for mounting to a horizontal support surface. It comprises a housing with a bottom end having an annular groove, a motor compressor unit operably disposed within the housing, and a mounting device. The mounting device is removably attached to the bottom end, for mounting the compressor to the horizontal support surface. It includes a resilient body member engaged about the housing to substantially cover the bottom end. Also, the device is engaged with the groove in the compressor housing end to vertically secure the housing.

The present invention is, in another aspect, a mounting apparatus for mounting a hermetic compressor to a horizontal support surface in a vertically upright manner. It comprises a resilient body member with a bottom surface attachable to the horizontal support surface. Additionally, the body member includes a top surface receptacle for receiving a bottom portion of the compressor. The receptacle includes an opening on the top surface shaped to receive the compressor, an upwardly extending annular protrusion shaped to fit into an annular groove on the compressor, and a plurality of retainers defining a circle with an inner circumference less than the outer circumference of the compressor so the retainers frictionally engage the compressor.

An advantage of the present invention is that a compressor may be mounted to a support base without the need for hardware welded to the outside of the compressor housing. Another advantage of the present invention is that sound radiating from the bottom of the compressor housing is suppressed. A further advantage of the mounting boot of the present invention is that the suppression of vibration and sound from a compressor mounted within an appliance cabinet is simply and economically achieved.

Still another advantage of the mounting boot of the present invention is that the particular frictional engagement of the boot with the compressor housing is maintained despite vibratory and shock forces that might otherwise cause disengagement.

An additional advantage of the present invention is that the mounting of a compressor to a support base is accomplished by attaching the compressor to a single part, i.e. a resilient body member, thereby simplifying installation. Also, an advantage is found in the present invention's versatility in mounting because of the integrally formed mounting extensions.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, wherein.

Figure 1:
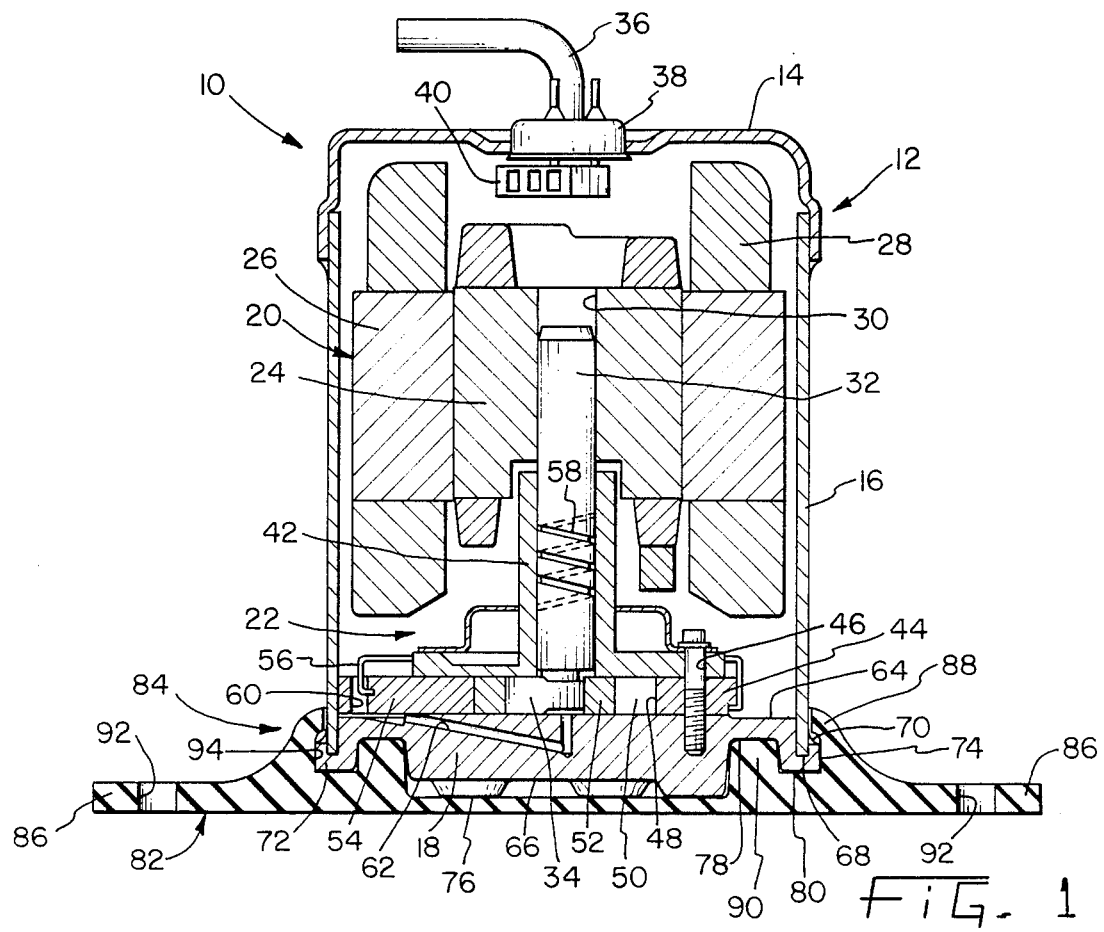
FIG. 1 is a side sectional view of the hermetic compressor and mounting boot of the present invention.

Corresponding reference characters indicate corresponding parts throughout the several views. The exemplifications set out herein illustrate a preferred embodiment of the invention, in one form thereof, and such exemplifications are not to be construed as limiting the scope of the disclosure or the scope of the invention in any manner.

DESCRIPTION OF THE INVENTION

In the embodiment of the present invention as shown in the drawings, and in particular in FIG. 1, a vertical axis hermetic rotary compressor 10 is shown having a housing 12 which comprises a top portion 14, a generally cylindrical central portion 16, and a bottom end plate 18. The three housing components are hermetically secured together by welding or brazing. Disposed within housing 12 is a motor compressor unit comprising an electric motor 20 and a rotary vane compressor mechanism 22. Motor 20 comprises a rotor 24 and a stator 26 which has windings 28. Stator 26 is secured to housing 12 by an interference fit, e.g. shrink fitting.

Rotor 24 has a central aperture 30 and within which a rotatable crankshaft 32 is secured by an interference fit. Crankshaft 32 includes an eccentric portion 34 drivingly connected to compressor mechanism 22, which compresses refrigerant for discharge into the interior of housing 12. A refrigerant discharge tube 36 is sealingly connected to top portion 14 of the housing, e.g. by soldering. Similarly, a hermetic electric terminal 38 is also secured to top portion 14, so a connector 40 can connect terminal 38 to interior of housing 12 for supplying electric power to motor 20.

Compressor mechanism 22 of FIG. 1 is a rotary vane compressor mechanism similar to the device described in U.S. Pat. No. 4,730,994 which is hereby incorporated by reference. Only a brief description is provided here to aid in the understanding of the present invention. Compressor mechanism 22 includes a main bearing 42 in which crankshaft 32 is rotatably journalled, end plate 18, and a compressor cylinder block 44 disposed between main bearing 42 and end plate 18. As shown in FIG. 1, end plate 18 is secured to main bearing 42 by means of a plurality of bolts 46.

Cylinder block 44 defines axial bore 48; main bearing 42, end plate 18, and bore 48 define a compression chamber 50. A roller 52 surrounds crankshaft eccentric 34 in compression chamber 50, and cooperates with a sliding vane 54 for compressing a refrigerant fluid in compression chamber 50 in a known manner. Additionally, a vane spring 56 provides a biasing force to the back of sliding vane 54. Compressor mechanism also includes a lubrication system similar to that described in U.S. Pat. No. 4,730,994, incorporated herein by reference, which includes helical passageways 58 formed in crankshaft 32, axial passageway 60 formed in cylinder block 44, and radial passageway 62 formed in end plate 18.

End plate 18 is a part of compressor mechanism 22 and serves as the bottom portion of housing 12. It is a circularly shaped plate having a top surface 64 and a bottom surface 66. At its periphery, an annular recess 68 is formed in top surface 64 which receives central portion 16, with weldment 70 securing portion 16 to plate 18. End plate 18 also includes a flange portion 72 having a greater diameter than central portion 16 to extend radially outward to the outer circumference of flange 72 which defines facing surface 74. The bottom surface 66 of end plate 18 comprises a middle circular surface 76 which is surrounded by an annular groove 78, which is circumferentially bordered by an outer annular support surface 80. The plane defined by outer annular support surface 80 lies between the planes defined by surface 76 and groove 78.

The present invention comprises mounting the compressor 10 upon a mounting boot 82, as shown in FIG. 1, to mount compressor 10 in an upright position on a horizontal support surface (not shown). The particular shape of the preferred embodiment is for use with a particular rotary compressor configuration, although the mounting boot of the present invention can be adapted for use with other shapes using the teachings of this disclosure. Mounting boot 82 is a unitary piece molded from Santoprene thermoplastic rubber material available from Monsanto Corporation of St. Louis, Mo. However, any other suitable resilient, flexible material may be used.

Figure 2:
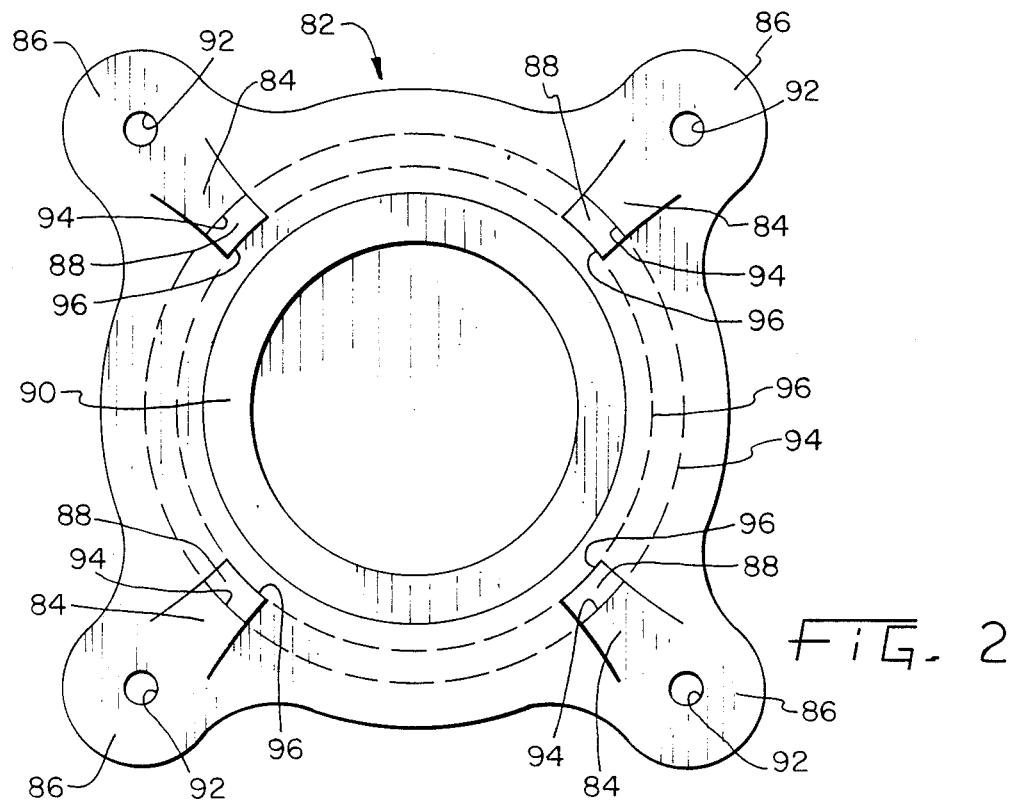
FIG. 2 is a top plan view of the mounting boot.

Referring to FIG. 2, mounting boot 82 comprises a plurality of retainers 84 and a plurality of circumferentially disposed boot extensions 86. Compressor 10 fits within retainers 84 while mounting extensions 86 are used to fasten boot 82 to a horizontal support surface of an appliance cabinet. Retainers 84 have an upper portion 88, which with annular protrusion 90 fit around the lower end of housing 12. Mounting extensions 86 have mounting holes 92 which are used to bolt boot 82 to an appliance. The configuration of mounting holes 92 shown in FIG. 2 represents only one arrangement of the various possible arrangements compatible with the present invention.

Retainers 84 define a circle having an outer circumference 94 which approximately matches the outer circumference of end plate 18 so that facing surface 74 of flange 72 directly abuts the retainer's lower, inner surface 94. However, upper portions 88 define an inner circumference 96 which extends over flange 72 thus trapping flange 72 and the entire housing 12 within retainers 84. In addition, annular protrusion 90 fits closely within groove 78 of end plate 18 to position and support compressor 10.

Within retainers 84, compressor 10 sets in a relatively vertical position with its bottom surface pressing down upon boot 82. However, spaces exist between bottom surface 66 and boot 82 which serve to muffle sound. Outer annular support surface 80 is supported by boot 82, with annular groove 78 being directly supported by upwardly extending annular protrusion 90 and parts of middle surface 76 touching boot 82. Retainer surface 94 abuts facing surface 74 to keep compressor 10 in a relatively stationary position.

In the preferred embodiment, four mounting extensions 86 are located about the circle defined by four retainers 84 so that the mounting holes 92 geometrically define a square. The mounting extensions 86 preferably at least partially support retainers 84, and are preferably made from a material harder than the material of boot 82.

While this invention has been described as having a preferred design it will be understood that it is capable of further modification. This application is therefore intended to cover any variations, uses, or adaptations of the invention following the general principles thereof and including such departures from the present disclosure as come within known or customary practice in the art to which this invention pertains and fall within the limits of the appended claims.

What is claimed is:

1. A vertically upright hermetic compressor for mounting to a horizontal support surface, comprising:
   a housing including a bottom end having an annular flange, said bottom end having one of an annular groove and an annular protrusion;
   a motor compressor unit operably disposed within said housing; and
   mounting means, removably attached to said housing bottom end, for mounting said compressor to the horizontal support surface, said mounting means comprising a resilient body member engaged about said housing and having the other of an annular groove and an annular protrusion interfitting with said one of said groove and protrusion on said housing and substantially covering said housing bottom end, and retaining means extending over said flange to vertically secure said housing.

2. The compressor of claim 1 wherein said housing includes an end plate having said flange thereon.

3. The compressor of claim 1 wherein said housing includes a top end, a generally cylindrical central portion, and an end plate at said bottom end.

4. The compressor of claim 3 wherein said end plate includes said flange.

5. The compressor of claim 1 wherein said retaining means includes a plurality of retainers, said retainers circumferentially surrounding said housing bottom end, said retainers defining an inner circle having a circumference less than the outer circumference of said housing bottom end flange.

6. The compressor of claim 1 wherein said bottom end includes said annular groove, and said resilient body member includes said annular protrusion shaped to engage said annular groove of said bottom end.

7. The compressor of claim 6 wherein said housing includes an end plate having said flange thereon.

8. The compressor of claim 7 wherein said retaining means includes a plurality of retainers, said retainers circumferentially surrounding said housing flange, said retainers defining an inner circle having a circumference less than the outer circumference of said housing flange.

9. The compressor of claim 1 wherein said mounting means includes a plurality of mounting extensions circumferentially disposed about said resilient body, said mounting extensions having mounting holes providing a means to attach said mounting means to the horizontal support surface.

10. A mounting apparatus for mounting a hermetic compressor to a horizontal support surface in a vertically upright manner, comprising: a resilient body member, including a bottom surface attachable to the horizontal support surface, and a top surface having receptacle means for receiving a bottom portion of the compressor, said receptacle means comprising an opening on said top surface shaped to receive the compressor, an upwardly extending cylindrical wall shaped to fit into an annular groove on the compressor, and a plurality of retainers positioned around said cylindrical wall and having an upper portion extending over the height of said cylindrical wall, each said retainer definging a restricted gap between said upper portion and said cylindrical wall, said restricted gap adapted for hooking around and frictionally engaging the compressor.

11. The mounting apparatus of claim 10 wherein said retainers define an inner circle having a circumference less than the outer circumference of the compressor bottom portion.

12. The mounting apparatus of claim 10 further comprising a plurality of mounting extensions circumferentially disposed about said resilient body member, said mounting extensions having mounting holes providing a means to attach said mounting extensions to a horizontal support surface.

13. The mounting apparatus of claim 10 wherein said resilient body member is comprised of thermoplastic rubber.

14. A vertically upright hermetic compressor for mounting to a horizontal support surface, comprising:
   an outer housing having operably disposed therein a motor compressor unit, said housing including a top end, a generally cylindrical central portion, a bottom end having an annular groove, and a radially outwardly extending housing flange portion adjacent said bottom end; and
   mounting means for mounting said compressor to the horizontal support surface in a vertically upright manner, said mounting means comprising a cup-shaped body member attachable to the horizontal support surface, said body member including a plurality of resilient retainers, an upwardly extending protrusion disposed within a wall portion of said body member interfitting with said annular groove, and said retainers defining an inner circle having a diameter less than the diameter of said flange portion such that said retainers hook around and are resiliently biased against said flange portion.

15. The compressor of claim 14 wherein each said retainer includes an inwardly facing surface located at its periphery, said retainers abutting said housing flange, said retainers having ends defining an inner circle having a circumference less than the outer circumference of said housing flange such that said retainers frictionally engage said flange.

16. The compressor of claim 14 wherein said mounting means includes a plurality of mounting extensions circumferentially disposed about said resilient body member, said mounting extensions having mounting holes providing a means to attach said mounting means to a horizontal support surface.

17. A mounting boot for mounting a hermetic compressor to a horizontal support surface, wherein the compressor includes a housing having a top end, a bottom end with an annular groove, and an intermediate portion, said boot comprising:

a resilient cup-shaped body member including a generally horizontal bottom portion attachable to a horizontal support surface, an upwardly extending cylindrical wall shaped to fit into said groove, and a plurality of retainers positioned around said cylindrical wall and each said retainer having an upper portion and an inwardly facing surface defining a restricted gap between said upper portion and said cylindrical wall, said restricted gap adapted for hooking around and frictionally engaging the compressor bottom end such that the compressor bottom end is substantially covered.

18. The mounting boot of claim 17 wherein each said retainer has a lower, inner surface adapted to abut the outer circumference of the housing bottom end and extend upwardly to the housing intermediate portion, and upper sections of said retainers defining an inner circle having a circumference less than the outer circumference of the housing bottom end.

19. The mounting boot of claim 17 further comprising a plurality of mounting extensions circumferentially disposed about said body member, said mounting extensions having mounting holes providing a means for attaching said boot to a horizontal support surface.

20. The mounting boot of claim 17 wherein said boot is comprised of thermoplastic rubber.

* * * * *